US012723551B2

(12) United States Patent
Harder

(10) Patent No.: US 12,723,551 B2
(45) Date of Patent: Sep. 1, 2026

(54) CONTROL DEVICE AND METHOD FOR OPERATING AN INTERNAL COMBUSTION ENGINE USING AT LEAST ONE TEMPORAL SPECIFICATION PARAMETER TRAJECTORY

(71) Applicant: Rolls-Royce Solutions GmbH, Friedrichshafen (DE)

(72) Inventor: Karsten Harder, Oberteuringen (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 0 days.

(21) Appl. No.: 18/769,608

(22) Filed: Jul. 11, 2024

(65) Prior Publication Data

US 2024/0392733 A1 Nov. 28, 2024

Related U.S. Application Data

(63) Continuation of application No. PCT/EP2023/051269, filed on Jan. 19, 2023.

(30) Foreign Application Priority Data

Jan. 20, 2022 (DE) ..................... 10 2022 101 330.8
Jan. 19, 2023 (WO) ................. PCT/EP2023/051269

(51) Int. Cl.
*F02D 41/14* (2006.01)

(52) U.S. Cl.
CPC .. *F02D 41/1406* (2013.01); *F02D 2041/1412* (2013.01); *F02D 2041/1433* (2013.01)

(58) Field of Classification Search
CPC ......... F02D 41/1406; F02D 2041/1433; F02D 2041/1412
See application file for complete search history.

(56) References Cited

U.S. PATENT DOCUMENTS 9,771,883 B1 9/2017 Haskara et al.
10,060,373 B2 8/2018 Wang et al.
(Continued)

FOREIGN PATENT DOCUMENTS

DE 10 2011 103 594 A1 12/2011
DE 10 2016 121 338 A1 5/2017

OTHER PUBLICATIONS

International Search Report and Written Opinion dated Apr. 25, 2023 for International Patent Application No. PCT/EP2023/051269 (15 pages).

*Primary Examiner* — Phutthiwat Wongwian
(74) *Attorney, Agent, or Firm* — TAYLOR & EDELSTEIN, PC

(57) ABSTRACT

A control device for an internal combustion engine includes: a primary control module and a secondary control module, the primary control module determining a setpoint specification for the secondary control module, the secondary control module being configured for determining a control specification for controlling an actuator depending on the setpoint specification, a determination module of the primary control module determining the setpoint specification via a model-based predictive control method taking into account a prediction horizon based on a physical time constant of the secondary control module, an operator interface of the primary control module receiving a temporal specification parameter trajectory for at least one specification parameter specified by an operator or an operator device, the determination module determining the setpoint specification depending on the temporal specification parameter trajectory—which has been received—via the model-based predictive control method by evaluating the temporal specification parameter trajectory for the prediction horizon.

16 Claims, 1 Drawing Sheet

(56) References Cited

U.S. PATENT DOCUMENTS

| | | | | |
|---|---|---|---|---|
| 2013/0067894 | A1 | 3/2013 | Stewart et al. | |
| 2017/0218815 | A1* | 8/2017 | Stewart .................... | F01N 3/208 |
| 2017/0364043 | A1* | 12/2017 | Ganti ...................... | G05B 17/02 |
| 2018/0216558 | A1 | 8/2018 | Buchholz et al. | |
| 2021/0003090 | A1 | 1/2021 | Bergmann et al. | |

* cited by examiner

CONTROL DEVICE AND METHOD FOR OPERATING AN INTERNAL COMBUSTION ENGINE USING AT LEAST ONE TEMPORAL SPECIFICATION PARAMETER TRAJECTORY

CROSS REFERENCE TO RELATED APPLICATIONS

This is a continuation of PCT application no. PCT/EP2023/051269, entitled "CONTROL DEVICE AND METHOD FOR OPERATING AN INTERNAL COMBUSTION ENGINE, OPERATOR DEVICE FOR OPERATING A POWER DELIVERY SYSTEM, INTERNAL COMBUSTION ENGINE ARRANGEMENT, AND POWER DELIVERY SYSTEM HAVING SUCH AN INTERNAL COMBUSTION ENGINE ARRANGEMENT", filed Jan. 19, 2023, which is incorporated herein by reference. PCT application no. PCT/EP2023/051269 claims priority to German patent application no. 10 2022 101 330.8, filed Jan. 20, 2022, which is incorporated herein by reference.

BACKGROUND OF THE INVENTION

1. Field of the Invention

The present invention relates to internal combustion engines, and, more particularly, to control devices for internal combustion engines.

2. Description of the Related Art

An internal combustion engine is normally controlled or regulated by a control device which may provide a hierarchy of different levels of control or regulation. Herein, a primary control module determines setpoint specifications for at least one secondary control module, typically for a plurality of secondary control modules, wherein—depending on the respective setpoint specification—the secondary control modules determine control specifications for the control of components or actuators for the operation of the internal combustion engine. In this way, superordinate control objectives, such as compliance with predetermined emission limits or the achievement of the lowest possible fuel consumption, can be considered at the superior level of the primary control module, wherein it is implemented in the respective secondary control modules how the setpoint specifications specified by the primary control module as being suitable for achieving the higher-level control objectives can be realized in the actuators. The various components of an internal combustion engine and thus also the secondary control modules assigned to the components typically have strongly divergent physical time constants, which are required to adjust setpoints. For example, combustion in a combustion chamber of the internal combustion engine takes place on a much shorter time scale than the setting of a certain boost pressure in the gas path of the internal combustion engine. Exhaust gas aftertreatment systems of the internal combustion engine, for example SCR catalytic converters, typically have even longer timescales.

If an internal combustion engine is operated by an operator, in particular within a power delivery system, for example a motor vehicle or in combination with a generator for the supply of electrical power, the operator or an operator device typically specifies specification parameters for the operation of the internal combustion engine, for example in the form of a torque requirement or the specification of a certain speed. These specification parameters are specified for a specific point in time, in particular as specifications that are currently to be met. Even if the internal combustion engine's control system uses a model-based predictive control method, the prediction only relates to the internal control or regulation of the individual components of the internal combustion engine. In this respect, the control device of the internal combustion engine is quasi-blind to the future, which is unfavorable to achieving specified control objectives as precisely as possible, especially when taking into account the aforementioned timescales.

What is needed in the art is a control device and a method for operating an internal combustion engine, an operator device for operating a power delivery system including an internal combustion engine, an internal combustion engine arrangement and a power delivery system with such an internal combustion engine arrangement, wherein the said disadvantages are at least reduced, optionally eliminated.

SUMMARY OF THE INVENTION

The invention relates to a control device and to a method for operating an internal combustion engine, an operator device for operating a power delivery system including an internal combustion engine, an internal combustion engine arrangement and a power delivery system having such an internal combustion engine arrangement.

The present invention provides a control device for an internal combustion engine. The control device has a primary control module which is designed to determine at least one setpoint specification for at least one secondary control module. The at least one secondary control module is designed to determine at least one control specification for controlling at least one actuator, depending on the at least one setpoint specification. The primary control module has a determination module which is designed to determine at least one setpoint specification by way of a model-based predictive control method, taking into account a prediction horizon based on a physical time constant of at least one secondary control module. The primary control module has an operator interface which is designed to receive at least one temporal specification parameter trajectory for at least one specification parameter, specified by an operator or an operator device, at least for the prediction horizon, in particular for the operation of the combustion engine, in particular a specification parameter of the internal combustion engine. The determination module is designed to determine the at least one setpoint specification depending on the at least one received temporal specification parameter trajectory by way of the model-based predictive control method, evaluating the specification parameter trajectory for the prediction horizon. The determination module is designed, in particular to receive at least one specification parameter trajectory. With the operator interface and thus the possibility of receiving from the operator or the operator device the specified temporal specification parameter trajectory for the at least one specification parameter at least for the prediction horizon, it is advantageously possible for the control device to quasi-look into the future, and to integrate a future development of at least one specification parameter at least on the timescale of the prediction horizon into the control or regulation of the internal combustion engine. In this way, the setpoint specifications and thus also the control specifications can then be determined in such a way that the dynamic behavior of also slower components of the internal combustion engine is optimally included in the control or regulating system, considering the future development of at least one specification parameter. This again, allows superordinate control objectives such as predetermined emission limits or minimum fuel consumption to be met with greater accuracy, while at the same time ensuring advantageously for the operator that the requested specification parameters can also be achieved by the internal combustion engine, at least on the timescale of the prediction horizon. In particular, this can also eliminate otherwise provided reserves for quantities or actuators that are to be adjusted. A valve control system for at least one combustion chamber of the internal combustion engine can also be advantageously adapted in advance. In particular, it is possible to early on adjust gas path variables such as boost pressure and inlet closure as well as fuel input in order to compensate for the inertia of underlying dynamics. Overall, improved emission behavior, higher performance and/or lower consumption results for the internal combustion engine regulated or controlled by the control device. These advantages are realized in a special way in an autonomous system, especially in an autonomous or autonomously operated vehicle.

The control device is designed, in particular, to operate an internal combustion engine.

In the context of the current technical teaching, a physical time constant of a secondary control module is understood as a time that elapses from a time when a new setpoint is set until the setpoint is set to 63% of a stationary final value. The physical time constant thus describes the timescale of the adjustment of the secondary control module.

In the context of the present technical teaching, a prediction horizon is understood in particular as a period of time that is considered from a current point in time into the future. The prediction horizon is or is derived in particular from the physical time constant, in particular is calculated as a multiple of the physical time constant or as a product of the physical time constant, in particular with a predetermined factor. The prediction horizon is in particular 1.5 to 6 times, optionally 2 to 5 times, optionally three times the physical time constant. It is possible that the prediction horizon is calculated by the control device. However, it is also possible that the prediction horizon is, or will be otherwise predetermined.

In the context of the present technical teaching, a trajectory is understood in particular to be a plurality of data points or values that are given as a function of time, in particular regardless of how dense the data points or values are on the time axis or how many data points or values are given. In particular, the trajectory does not have to be a continuous function of time, but rather the data points or values of the trajectory can be discretely given. However, the trajectory can also be a continuous function of time. In particular, the trajectory includes a plurality of data points or values for a current point in time and future points in time, at least up to the current point in time plus the prediction horizon. The trajectory can be predefined beyond the prediction horizon; in this case, however, it is only evaluated-if necessary, in sections—for the prediction horizon.

The operator interface is designed in particular to receive the specification parameter trajectory in real time, especially during the running period of the internal combustion engine and during actual operation of the internal combustion engine. The operator interface is designed in particular to continuously receive the specification parameter trajectory, which is continuously updated, especially for the prediction horizon originating from a current point in time and thus progressing over time.

The operator interface can be used in particular to receive a specification parameter trajectory created by the operator or the operator device in real time. Thus, especially precise control or adjustment, adapted to the actual operating conditions of the internal combustion engine are possible. The operating parameter trajectory is therefore advantageously not created in advance by the operator or operator device, but rather determined ad hoc, in real time for the actual operation of the internal combustion engine and/or in particular created by the operator. This does not exclude the possibility that experience and/or data from the past will be incorporated into the determination of the specification parameter trajectory. Again, this is particularly advantageous if the internal combustion engine is subject to recurring operating conditions and/or if it is operated in a vehicle that drives or operates autonomously, in particular. This is particularly advantageous if the vehicle regularly travels a certain route or performs certain work under regular conditions, as is the case with rail vehicles or mining vehicles, for example.

The possibility of receiving a specification parameter trajectory created in real time and during the runtime of the internal combustion engine during actual operation via the operator interface opens up far-reaching advantages for the operation of autonomous systems, especially autonomously driving or operated vehicles with regard to performance, emission behavior, and consumption reduction.

In the context of the present technical teaching, operating the internal combustion engine is understood in particular as controlling or regulating, optionally regulating, the operation of the internal combustion engine.

In the context of the present technical theory, a primary control module is understood in particular to be a module hierarchically superior or superordinate to a secondary control module, which is designed to specify a setpoint specification for the secondary control module, in particular as a setpoint to be set by the secondary control module. In one embodiment of the control device, the primary control module is also designed to receive at least one feedback value from the secondary control module, in particular at least an actual value for a physical measured value, a time constant that at least co-determines the prediction horizon for the secondary control module, and/or at least a target limit value. Such a target limit value defines a limit for the setpoint specification to be set by the secondary control module, for example because due to physical reasons the secondary control module cannot regulate a setpoint specification that exceeds the target limit value.

In the context of the present technical teaching, a secondary control module is understood in particular as a module hierarchically subordinate or secondary to a primary control module, which is designed to receive a setpoint specification from the primary control module and, depending on the at least one setpoint specification, to determine the at least one control specification for control of the at least one actuator. In one embodiment of the control device, the secondary control module is also designed to return at least one feedback value to the primary control module, in particular to the determination module and/or to an operating limit module explained in more detail below, in particular the at least one actual value for a physical measured value, the time constant that at least co-determines the prediction horizon for the secondary control module, the at least one target limit value, and/or an error message, for example stating that an actuator, especially a flap, is jammed or hung-up. The secondary control module itself is therein optionally designed to consider control variable limits of the controlled actuators, in particular to consider the control variable limits when determining the at least one target specification limit value. In an embodiment, the secondary control module is designed to receive at least one control variable limit from a subordinate tertiary control module or an actuator. Such a control variable limit can be, for example, a flap stop, or generally a limitation of a regulating distance, a maximum pressure, or a maximum component speed, for example in an exhaust gas turbocharger.

The control specification determined by the secondary control module can in particular be directly a control variable for an actuator. Alternatively, the control specification can also be a secondary setpoint specification for a tertiary control module. In this case, the secondary control module is hierarchically superior or superordinate to the tertiary control module, wherein the tertiary control module is hierarchically subordinate or secondary to the secondary control module, and—depending on the secondary setpoint specification—the tertiary control module is designed to determine a further control specification for the control of the at least one actuator, in particular as a direct control variable for the actuator.

The at least one actuator may in particular be an actuator of the internal combustion engine. The actuator can in particular be an actuator of an engine block of the internal combustion engine. However, the actuator can also be an actuator outside the internal combustion engine, in particular outside an engine block, for example an actuator intended to influence an externally provided cooling circuit, for example a valve, a pump or the like, or an actuator of a gearbox to which the internal combustion engine is operatively connected.

In the context of the present technical teaching, a module is generally understood in particular as a functional unit which can be defined or delimited conceptually or physically and which is designed to perform at least one specific function. This can be a separate computing device, a part of a computing device, a hardware structure, or a software structure that is designed and intended to perform at least one specific function.

In one embodiment, the control device has a plurality of secondary control modules, wherein the control device is designed to use, as a prediction horizon, a time duration that is determined depending on the physical time constant of the slowest secondary control module, in other words, that of the secondary control module that has the longest physical time constant for the adjustment of a setpoint specification. Specifically, the prediction horizon is calculated by multiplying the physical time constant of the slowest secondary control module by a factor, wherein the factor is optionally 1.5 to 6, optionally 2 to 5, optionally 3.

In the context of the present technical teachings, a model-based predictive control method is understood in particular as a model predictive control (MPC).

According to a further development of the invention, it is provided that the determination module is designed to conduct an optimization of at least one setpoint specification by determining an extreme value of a cost function, wherein the at least one received temporal specification parameter trajectory enters into the cost function, and wherein the cost function is evaluated for the prediction horizon. In particular, this provides the advantageous possibility to comply with or achieve as precisely as possible higher-level control targets, especially those that are incorporated into the cost function, by taking into account the development over time of the at least one target parameter. The fact that the cost function is evaluated means, in particular, that an extreme value is determined for the cost function; in particular, the cost function is minimized for the prediction horizon.

In one embodiment, cost function I has the following general form in particular, depending on the target value specification u(t):

$$I(u, x, z) = \frac{1}{t_P}\int_{t'}^{t'+t_P}\sum_i \Gamma_i\left(1-\frac{J_i(u(t), x(t), z)}{J_{i,s}(t)}\right)^2 dt, \tag{1}$$

wherein the integration is carried out from a current point in time t' to a future point in time, which results by adding prediction horizon $t_p$ to current time t', wherein the run index i runs over all cost terms Ji(u(t),x(t),z) which are included in the cost function and for which default values $J_{i,s}(t)$ specified in the form of control targets or specification parameters. In general, x(t) refers to the measurands that co-determine respective cost term Ji(u(t),x(t),z); z refers to conditions that cannot be influenced and on which the respective cost term Ji(u(t),x(t),z) depends, for example, the ambient pressure, A time dependence of conditions z that cannot be influenced is not explicitly stated here, since in a good approximation they can typically be assumed to be constant on the time scale of the prediction horizon. Of course, it is also possible to consider an explicit time dependence for the conditions that cannot be influenced. The cost function also includes weighting factors $\Gamma_i$. The default values $\Gamma_i$Ji,s(t) can be constant in time—$J_{i,s}$(t)=const—or, in particular, variable in time as default trajectories. In particular, the at least one default trajectory is included in the cost function as a time-dependent default value $J_{i,s}(t)$. Pre-factor 1/tP serves advantageously to normalize the cost function, thereby rendering it independent of the temporal length of the prediction horizon, and it also ensures that the value of the cost function is dimensionless; however, pre-factor 1/tP can also be omitted, especially since it is irrelevant for the minimum search explained below. The cost terms Ji(u(t),x(t),z) depend on the at least one setpoint specification u(t), in particular in the form of a setpoint specification vector, so that for the at least one setpoint specification u(t) an optimal setpoint specification $u_{opt}$ can be obtained by determining the extremum, in the given definition according to equation (1), in particular the minimum, of the cost function:

$$u_{opt} = \underset{u}{\operatorname{argmin}} I(u, x, z) = \underset{u}{\operatorname{argmin}} \frac{1}{t_P}\int_{t'}^{t'+t_P}\sum_i \Gamma_i\left(1-\frac{J_i(u(t), x(t), z)}{J_{i,s}(t)}\right)^2 dt. \tag{2}$$

In particular, the extremum of the cost function is determined under constraints, in particular under the following constraints:

$$\dot{x}(t) = f(u(t), x(t)), \tag{2a}$$

wherein the suitably selectable function ƒ(u(t),x(t)) represents a model for the dynamics of the measurand x(t);

$$u^{min} \le u(t) \le u^{max}, \tag{2b}$$

with suitably selectable limits $u^{min}$, $u^{max}$ for the setpoint specification u(t);

$$x(0) = x_0, \tag{2c}$$

as a starting condition for the measured variable x(t) with suitably selectable $x_0$, for example a current measured value, and a constraint function $$h(u(t), x(t)) \leq 0. \tag{2d}$$

In particular, cost terms Ji(u(t),x(t),z) are calculated by the at least one Gaussian process model described in more detail below or by using the at least one Gaussian process model.

For example, according to equation (1), the cost function can take the following specific form:

$$I(u, x, z) = \int_{t'}^{t'+t_P}\left(\Gamma_1\left(1-\frac{c_D(u(t), x(t), z)}{c_{D,s}(t)}\right)^2 + \Gamma_2\left(1-\frac{M(u(t), x(t), z)}{M_s(t)}\right)^2 + \Gamma_3\left(1-\frac{e_{NOX}(u(t), x(t), z)}{e_{NOX,s}(t)}\right)^2 + \Gamma_4\left(1-\frac{n(t)}{n_s(t)}\right)^2\right)dt, \tag{3}$$

with target fuel consumption $C_{D,s}$ and target nitrogen oxide emissions $e_{Nox,s}$ as control target variables, as well as the target torque trajectory $M_s(t)$ and the target speed trajectory $n_s(t)$ as specification parameter trajectories. If the torque is specified as the specification parameter, the target speed trajectory is in particular an actual speed predicted over the prediction horizon. Numerous other variables can be included in the cost function; for example, an exhaust gas temperature can be included in the cost function as an additional variable.

According to a further development of the invention, it is provided that the at least one specification parameter is selected from a group consisting of: a power requirement; a torque; and a speed. In one embodiment, it can be provided that for at least two specification parameters, a specification parameter trajectory is received for each of them, wherein the at least two specification parameters are selected from the previously mentioned group.

According to a further development of the invention, it is provided that the at least one secondary control module is selected from a group consisting of: a fuel supply regulator; a gas path regulator; and an exhaust gas aftertreatment regulator. These secondary control modules have physical time constants that, in any event, are significantly longer than the time scale of combustion in a combustion chamber of the internal combustion engine. Typically, the fuel supply regulator is assigned a first physical time constant that is shorter than a second physical time constant assigned to the gas path regulator, wherein the exhaust gas aftertreatment regulator is assigned a third physical time constant that is longer than the second physical time constant assigned to the gas path regulator. In one embodiment, it is provided that the control device has at least two secondary control modules, each selected from the aforementioned group. In one embodiment, it is provided that the control device has exactly two secondary control modules, in particular a first secondary control module designed as a fuel supply regulator and a second secondary control module designed as a gas path regulator. In one embodiment, it is provided that the control device has all three secondary control modules of the group, in other words, a fuel supply regulator, a gas path regulator and an exhaust gas aftertreatment regulator.

A fuel supply regulator as a secondary control module receives in particular an injection start, an injection mass and, if necessary, a rail pressure, in particular an injection or fuel injection pressure as the setpoint specifications from the primary control module. The fuel supply regulator is also designed in particular to determine, depending on the setpoint specifications, a start, duration and/or end of power supply for a fuel input device, in particular an injector, and, where applicable, a control variable for at least one rail actuator, selected from a group consisting of a pressure control valve of a fuel rail, a suction throttle, and a fuel pump as control defaults.

A gas path regulator as a secondary control module receives in particular an air mass flow and a boost pressure as setpoint specifications from the primary control module. The gas path regulator is also set up in particular to determine a flap position or valve position for at least one gas flap or gas valve, in particular a throttle valve in the air path or a bypass valve of an exhaust gas turbocharger, as control specifications, depending on the setpoint specifications.

An exhaust gas aftertreatment regulator receives in particular a target pollutant concentration in the exhaust gas, for example a target nitrogen oxide concentration, as a target value specification from the primary control module. The exhaust gas aftertreatment regulator is also designed in particular to determine, depending on the setpoint specification, a control variable for a reactant delivery device for the introduction of a reactant, for example a reducing agent, into the exhaust gas flow as a control specification.

According to a further development of the invention, it is provided that the control device, in particular the primary control module, also has an operating limit module which is operatively connected with the operator interface and is designed to receive the at least one specification parameter trajectory—in particular from the operator interface. The operating limits module is moreover designed to limit the at least one specification parameter trajectory based on at least one predetermined operating limit or limit for the internal combustion engine, and to receive at least one first limited specification parameter trajectory. Alternatively, or additionally, the operating limits module is designed to determine at least one operating limit trajectory for the prediction horizon for at least one operating limit or limitation of the internal combustion engine based on the at least one specification parameter trajectory. In particular, the operating limits module is operatively connected with the determination module. The operating limits module is designed to transmit at least a first trajectory, selected from the at least one first limited specification parameter trajectory and the at least one operating limit trajectory, to the determination module for determination of the at least one setpoint specification. The determination module is moreover designed to determine the at least one setpoint specification based on the at least one first trajectory selected from the first limited specification parameter trajectory and the at least one operating limits trajectory. In this way, limitations, in particular physical or mechanical, in particular material-related limitations, for the operation of the internal combustion engine can be taken into account when determining the at least one setpoint specification, thus ensuring reliable operation of the internal combustion engine. In one embodiment of the control device, the primary control module includes the operating limits module. In one embodiment, the operating limits module is designed to receive at least one operating limit, in particular in the form of a target limit value from the at least one secondary control module.

In the context of the present technical teaching, a limited specification parameter trajectory is understood in particular as a trajectory for the specification parameter in which the individual time-dependent values are limited—in particular on the basis of at the least one predetermined operating limit, a limitation or a requirement. Specifically, the limited specification parameter trajectory is obtained by limiting the received specification parameter trajectory. For example, the limited specification parameter trajectory may contain values for the torque of the internal combustion engine that are limited based on the at least one predetermined operating limit, limitation, or requirement.

In contrast, in the context of the present technical teaching, an operating limits trajectory is understood in particular as a trajectory for the at least one operating limit, that is, in particular a temporal sequence of time-dependent values determined, in particular calculated, for at least one predetermined operating limit or limitation, in particular for a period from the present point in time to a future point in time, whereby the time period is determined by addition of the prediction horizon to the current point in time. For example, such an operating limit trajectory can include time-dependent values for a maximum peak combustion chamber pressure, which in turn can vary depending in particular on the speed of the internal combustion engine.

According to a further development of the invention, it is provided that the control device, in particular the primary control module, has a requirement module which is operatively connected to the operator interface and designed to obtain at least one specification parameter trajectory, in particular from the operator interface. The requirement module is moreover designed to limit the at least one specification parameter trajectory on the basis of at least one predetermined, in particular legal, requirement for the operation of the internal combustion engine and to obtain at least one second limited specification parameter trajectory. Alternatively, or additionally, the requirement module is designed to determine by way of the at least one specification parameter trajectory at least one requirement trajectory for the prediction horizon for at least one requirement for the operation of the internal combustion engine. In particular, the requirements module is operatively connected to the determination module. The requirement module is designed to transmit at least one second trajectory—selected from the at least one second limited specification parameter trajectory and the at least one requirement trajectory—to the determination module for determining the at least one setpoint specification. The determination module is designed to determine the at least one set point specification by way of the at least one second limited trajectory selected from the second limited specification parameter trajectory and the at least one requirement trajectory. Requirements for the operation of the internal combustion engine can thereby be advantageously considered when determining the at least one setpoint specification, thus ensuring conformity to requirements in the operation of the internal combustion engine. Such requirements may be aimed especially to environmental protection, health protection, noise protection or other protection objectives, in particular statutory ones. In one embodiment of the control device, the primary control module has the request module.

In the context of the present technical teaching, a requirement trajectory is understood in particular as a trajectory for at least one requirement, that is, in particular a temporal sequence of time-dependent values determined, in particular calculated, for the at least one requirement, in particular for a period from the current point in time to a future point in time, wherein the period of time is obtained by adding the prediction horizon to the current point in time.

One embodiment of the control device has a target specification module. In particular, the target specification module is operatively linked to the determination module. The target specification module is designed to determine at least one target specification, in particular predetermine it, and to transmit the at least one target specification in particular as a control target to the determination module for determination of at least one setpoint specification. The determination module is designed to determine the minimum set point specification by way of the at least one target specification. Advantageously, additional targets for the operation of the internal combustion engine can be considered thus, when determining the at least one setpoint specification, wherein operation of the internal combustion engine in conformity with additional targets specified, for example, by a manufacturer of the internal combustion engine or by the operator can be ensured. In one embodiment of the control device, the primary control module has the target specification module.

A further development of the invention provides that the at least one predetermined operating limit is selected from a group consisting of: a maximum peak combustion chamber pressure; a maximum exhaust gas temperature; a maximum combustion chamber pressure gradient; and a latest fuel injection end point. These variables or operating limits are relevant in particular for the reliable operation of the internal combustion engine, especially in the long term. The at least one predetermined operating limit can be incorporated in particular into the cost function, in particular to limit specification values $J_{i,s}$ (t), or the extremum of the cost function can be found under the secondary condition of compliance with at least one operating limit.

A further development of the invention provides that at least one predetermined requirement is selected from a group consisting of: a maximum nitrogen oxide emission; a maximum particulate emission; and a maximum hydrocarbon emission. In particular, at least one predetermined requirement can enter into the cost function, in particular to limit specification values Ji,s(t), or the extremum of the cost function can be found under the secondary condition of compliance with at least one predetermined requirement.

In one embodiment of the control device, the target specification module is designed to set a target of minimum fuel consumption or target fuel consumption. Alternatively, the minimum fuel consumption or target fuel consumption can also be determined as a predetermined requirement by the requirements module. The at least one target specification can be entered into the cost function, in particular directly as a default value Ji,s(t) or to limit the default values Ji,s(t); or the extremum of the cost function can be found under the secondary condition of compliance with at least one target specification.

A further development of the invention provides that the determination module is designed to perform the model-based predictive control method on the basis of at least one Gaussian process model. Gaussian process models are especially suited to control an internal combustion engine: compared to polynomial-based models, they are more adaptable to new or changed data points in the field of application, and also exhibit a more suitable and physically correct behavior in marginal areas of the given parameter scope. Compared to physical models, significantly less computational effort is required. They also allow direct use of test bench data. Such a Gaussian process model is provided in particular by stored data points ($X_b$, $Y_b$), for example obtained in test bench tests, wherein with $X_b$ $\varepsilon R^{n \times m}$ in particular n input variables for m different operating states and with $Y_b$ $\varepsilon^{Rm \times k}$ in particular k output variables for the m different operating states are stated. In particular, input variables $X_b$ form a subset of the union set from the setpoint values u(t) shown above, measured variables x(t) and conditions that cannot be influenced z. Cost terms Ji(u(t),x(t), z) can in turn be a subset of the initial variables $Y_b$, or the cost terms Ji(u(t),x(t),z) can be calculated from the initial variables $Y_b$. Alternatively, it is however also possible that at least certain cost terms Ji(u(t),x(t),z) do not, or do only implicitly depend on output variables $Y_b$, for example the cost term relating to the speed. The Gaussian process model is moreover provided by a specified calculation model for an expected value $E(X_u) \varepsilon R^{l\times k}$ and a variance $Var(X_u)$ for input variables not contained in the original data set for l different operating states $X_u \varepsilon R^{n\times l}$:

$$E(X_u) = m(X_u) + K(X_u, X_b)\left(K(X_b, X_b) + \sigma^2 I\right)^{-1}\left(Y_b - m(X_b)\right), \quad (4)$$

$$\mathrm{Var}(X_u) = K(X_u, X_u) + \sigma^2 - K(X_u, X_b)\left(K(X_b, X_b) + \sigma^2 I\right)^{-1} K(X_b, X_u), \quad (5)$$

with a mean value function $m(X_u)$, a predetermined variance $\sigma^2$, the unit matrix I, and a covariance function K, which depends on the Euclidean distance r between two points $x_1$, $x_2$ as follows:

$$K(X^1, X^2) = \left(k\left(X^1_{1:n,i}, X^2_{1:n,j}\right)\right)_{i=1, \ldots, m, j=1, \ldots, m}, \quad (6)$$

$$k(x_1, x_2) = \sigma_F^2 \exp\left(-\frac{r(x_1, x_2)^2}{2l^2}\right), \quad (7)$$

with a predetermined distance parameter/and a predetermined signal variance $\sigma_F$. Thus, in equations (4) and (5) $\sigma_F K(X_u, X_b) \varepsilon R^{l\times m}$, $K(X_b, X_b) \varepsilon R^{m\times m}$, $I \varepsilon R^{m\times m}$ and $Y_b \varepsilon R^{m\times k}$ apply.

The mean value function m(x) is optionally again obtained as a Gaussian process model.

First, a first Gaussian process model, also known as a base grid, is adapted to second test bench data under at least one secondary condition derived from the first test bench data. In particular, input variables $X_b$ are selected, and the corresponding output variables $Y_b$ are calculated in such a way that a deviation of the expected value E(X) of the first Gaussian process model, which is derived from input variables $X_b$ and output variables $Y_b$, is minimized to the second test bench data in compliance with the secondary condition. Moreover, for the purpose of determining the first Gaussian process model, m(x)=0 is optionally assumed for its mean function. The first test bench data covers thereby a larger parameter range than the second test bench data. In particular, it is possible that the first test bench data is measured on a single-cylinder test bench, whereas the second test bench data is measured on the multi-cylinder engine or also on the single-cylinder test bench and in the latter case is optionally converted to the multi-cylinder engine by way of a simulation model. The secondary condition is optionally obtained as a trend, for example, to determine whether certain parameters are linear or monotonic to each other. If no such trend is detected, the secondary condition can be omitted, whereby the adaptation of the Gaussian process model to the second test bench data is then also designated as unlimited.

The thus obtained expected value of the first Gaussian process model is then used in a next step as the mean value function m(x) in a second Gaussian process model, into which the second test bench data are now included as known input variables $X_{b2}$ and output variables $Y_{b2}$.

In particular, the cost terms Ji(u(t),x(t),z) described above are calculated by the at least one Gaussian process model or with the assistance of the at least one Gaussian process model.

In one embodiment, the control device is designed to adapt the Gaussian process model according to equations (4) to (7) during operation of the internal combustion engine, that is, in particular in the field of application. For this purpose, newly measured data points (Xb', Yb') can be added, in particular during operation of the internal combustion engine, or data points (Xb, Yb) from the test bench data that are identified as capable of improvement can be replaced by newly measured data points.

$$(X_b', Y_b').$$

A further development of the invention provides that the determination module is designed to determine the at least one setpoint specification as the setpoint trajectory for the prediction horizon. Compared to current determination of the setpoint specification, the time-dependent determination of the setpoint specification as a setpoint trajectory allows a particularly precise operation of the internal combustion engine.

The control device is designed, in particular to solve an optimization problem on a limited discrete time horizon, namely the prediction horizon, wherein the following criteria are met: the temporal average deviation between the target trajectories and the corresponding model values is minimal; this is ensured in particular by determining the extreme value of the cost function. At the same time, all specified limitations, requirements and targets are complied with at any point in time of the prediction horizon, whereby these can themselves vary advantageously over time. A control trajectory of the respective control variables lies within the control variable limits specified by the subordinate controllers at all times. The dynamic behavior of physical variables such as boost pressure and air mass flow in particular is optimally compensated. It is advantageously assumed that the fuel delivery system of the internal combustion engine, especially the injection system, has insignificant dynamics. The prediction of the underlying dynamics always begins in the actual values of the current sampling time.

The present invention also provides a method for operating an internal combustion engine, wherein at least one temporal specification parameter trajectory is provided for at least one prediction horizon based on a physical time constant of at least one secondary control module for the internal combustion engine. At least one setpoint specification for the at least one secondary control module is determined depending on the at least one temporal specification parameter trajectory by way of a model-based predictive control method by evaluating the specification parameter trajectory for the prediction horizon. Depending on the at least one setpoint specification, at least one control module determines at least one control specification, and at least one actuator is controlled by way of the at least one control specification. In connection with the method, there are in particular those advantages that have already been described in regard to the control device.

The method includes in particular at least one step that has been explained explicitly or implicitly in connection with the control device. The control device is designed in particular for carrying out the method according to the invention, in particular in the manner previously explained in connection with the control device.

In particular, the at least one setpoint specification is determined by a primary control module.

In particular, the at least one temporal specification parameter trajectory is received by an operator interface of the primary control module.

In particular, the at least one setpoint specification is determined by a determination module of the primary control module depending on the at least one temporal specification parameter trajectory by way of the model-based predictive control method, by evaluating the specification parameter trajectory for the prediction horizon.

According to a further development of the invention, it is provided, that at least one specification parameter trajectory is provided by an operator or an operating device of the internal combustion engine. In particular, the specification parameter trajectory is therefore not determined by the control device but is given to the control device externally by the operator or the operator device. The operator or the operator device has sufficient prior knowledge, especially from historical data, to determine the specification parameter trajectory for the operation of the internal combustion engine. In particular, this may be prior knowledge of a route regularly covered by a vehicle equipped with the internal combustion engine, in particular including the gradients, curves and stopping points that are part of said route, or of tasks to be carried out regularly by way of the internal combustion engine, in particular with regularly changing loads, for example in the case of a mining vehicle. However, the specification parameter trajectory can also be developed ad hoc from data measured proactively, especially by safety or driver assistance systems, for example from data obtained by a radar system, a Lidar system, optical cameras, ultrasonic sensors or other suitable sensor technology. In this way, a load for the internal combustion engine can also be predicted via the prediction horizon, so that the internal combustion engine can be operated accurately by determining the specification parameter trajectory. This proves to be particularly advantageous in connection with an autonomous vehicle with an internal combustion engine.

According to a further development of the invention, it is provided that the at least one specification parameter trajectory is determined depending on a load variable reported back by the internal combustion engine, in particular by the control device. In this way, feedback to the actual load occurs advantageously. In particular, the reported load variable can also be a load trajectory stored from the past, for example from covering a repeatedly traveled distance or repeatedly performed tasks. In one embodiment, the reported load variable is selected from a group consisting of an actual torque, an actual power and an actual speed of the internal combustion engine.

The present invention also provides an operator device for operating a power delivery system including an internal combustion engine, wherein the operator device is designed for the determination of at least one specification parameter trajectory for use as a specification parameter trajectory in a control device according to the invention or a control device according to one or more of the embodiments described above, or for use in a method according to the invention or a method according to one or more of the embodiments described above. In connection with the operating device, there are in particular those advantages that have already been described in connection with the control device or the method.

The operator device optionally has a trajectory interface to output the at least one specification parameter trajectory to the control device. Alternatively, or additionally, the operator device optionally has a load variable interface that is designed to receive the reported load variable from an internal combustion engine arrangement including the internal combustion engine and the control device, in particular from the internal combustion engine or control device.

In one embodiment, the operator device is designed to determine the at least one specification parameter trajectory depending on the load size reported by the internal combustion engine arrangement, in particular by the internal combustion engine or by the control device. In this way, feedback to the actual load is advantageous.

In particular, the operator device is designed to store the reported load variable so that a load trajectory stored for the past can also be used as the reported load variable, which is obtained, for example, from traveling a recurring route or from repeatedly performed tasks. In one embodiment, the reported load variable is selected from a group consisting of an actual torque and an actual speed of the internal combustion engine.

In one embodiment, the operating device is designed to operate a power delivery system, in the embodiment of a motor vehicle, in particular a rail vehicle or a mining vehicle.

The present invention also provides an internal combustion engine arrangement with an internal combustion engine and a control device according to the invention or with a control device according to one or more of the embodiments described above. Advantages result in particular in connection with the combustion engine arrangement that have already been explained in connection with the control device, the process or the operator device.

Ultimately, the objective is also met by creating a power supply system with an internal combustion engine arrangement according to the invention or with an internal combustion engine arrangement according to one or more of the embodiments described above. Advantages result in particular in connection with the power delivery system that have already been explained in connection with the control device, the process, the operator device or the combustion engine arrangement.

In one embodiment, the power delivery system is designed as a motor vehicle, in particular as a rail vehicle or as a mining vehicle. In one embodiment, the power delivery system is designed as an autonomously driven or autonomously operated, in short autonomous, motor vehicle.

In one embodiment, the power delivery system includes an operator device according to the invention or an operator device according to one or several of the embodiments described above.

In another embodiment, an operator device according to the invention or an operator device according to one or more of the embodiments described above is provided externally to the power delivery system and is operatively connected to the power delivery system via a wireless or wired operative connection.

In particular, the operator device is operatively connected to the control device of the internal combustion engine arrangement in order to transmit the at least one specification parameter trajectory to the control device, and optionally to receive the reported load variable from the internal combustion engine assembly, in particular from the internal combustion engine or from the control device. In particular, the trajectory interface of the operator device is operatively connected to the operator interface of the control device.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 1:
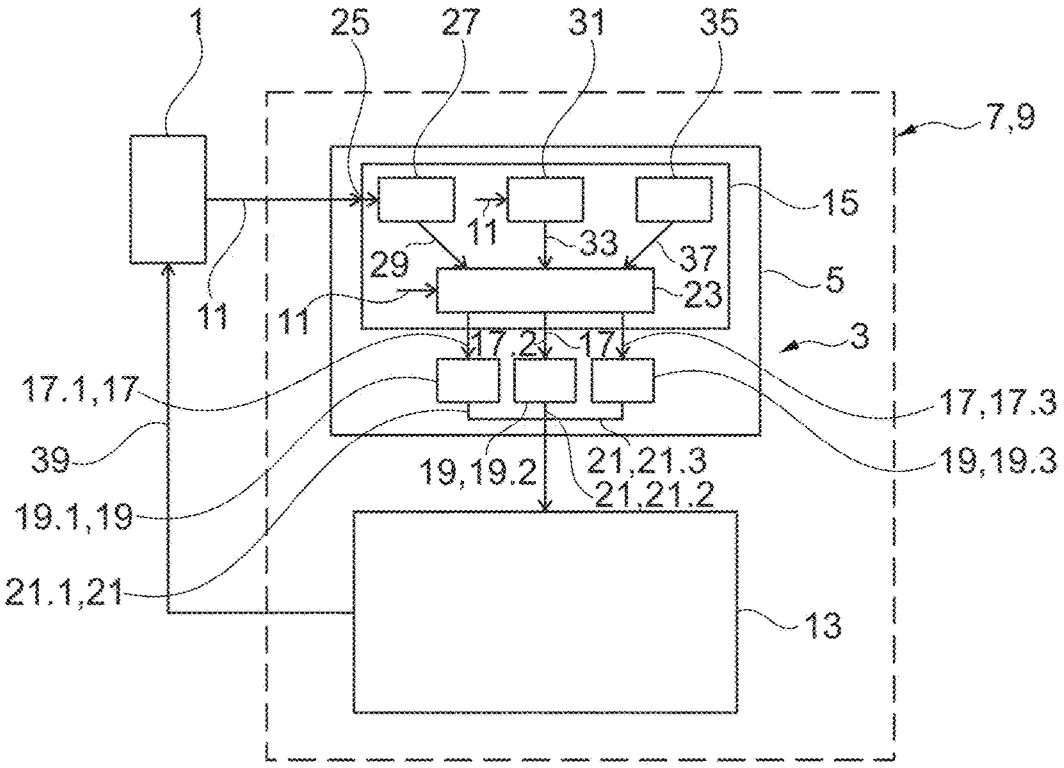
FIG. 1 is a schematic representation of a design example of an operating device in combination with a design example of a power delivery system including a design example of an internal combustion engine arrangement with an internal combustion engine and a design example of a control device.

FIG. 1 shows a schematic representation of an embodiment of an operator device 1 in combination with a design example of a power delivery system 7 with an embodiment of an internal combustion engine arrangement 3 with a design example of a control device 5. Power delivery system 7 is designed in particular as a motor vehicle 9, in particular as a rail vehicle or mining vehicle. Optionally, power delivery system 7 is designed as an autonomous motor vehicle 9. Operator device 1 is intended, in particular, to be external to power delivery system 7 and is operatively connected to it via a cable or optionally wireless connection, in particular via a radio network, such as a satellite network, a mobile network or Wifi.

In particular, operator device 1 is operatively connected to control device 5 and is designed to determine at least one specification parameter trajectory 11, in particular a target torque trajectory or a target speed trajectory, and to transmit at least one specification parameter trajectory to control device 5.

Internal combustion engine assembly 3 includes control device 5 on the one hand and an internal combustion engine 13 on the other. In one embodiment of internal combustion engine arrangement 3, internal combustion engine 13 is designed as a diesel generator. However, it is also possible to design it as a gasoline engine, as a gas engine, as a dual-fuel engine, or in another suitable manner.

Control device 5 is designed to operate internal combustion engine 13 and has a primary control module 15, arranged to determine at least one setpoint specification 17 for at least one secondary control module 19, in this case for three secondary control modules 19. Depending on respective setpoint specification 17, secondary control modules 19 are each arranged to determine at least one control specification 21 for the control of at least one actuator—in particular internal combustion engine 13.

Primary control module 15 has a determination module 23 that is designed to determine the at least one setpoint specification 17 by way of a model-based predictive control method by taking into account a prediction horizon based on a physical time constant of at least one secondary control module 19 of the secondary control modules 19, where the prediction horizon is optionally based on the physical time constant of the slowest secondary control module 19 of secondary control modules 19. Slowest secondary control module 19 is the secondary control module 19 that requires the longest time to adjust a setpoint, in other words, has the longest physical time constant. In particular, the prediction horizon is calculated by multiplying the physical time constant of slowest secondary control module 19 by a factor, wherein the factor is optionally 1.5 to 6, optionally 2 to 5, optionally 3.

Moreover, primary control module 15 has an operator interface 25 which is arranged to receive at least one temporal specification parameter trajectory 11 specified by operator device 1 for at least one specification parameter, in particular for the operation of internal combustion engine 13, in particular one specification parameter of internal combustion engine 13. Determination module 23 is again arranged to determine the at least one setpoint specification 17 depending on the at least one received temporal specification parameter trajectory 11 by way of the model-based predictive control method by evaluating the at least one specification parameter trajectory 11 for the prediction horizon. This facilitates advantageous targeted control of internal combustion engine 13 by considering future developments, so that reserves for control variables can be dispensed with. This makes the operation of internal combustion engine 13 especially target-compliant on the one hand and particularly economical on the other.

Determination module 23 is optionally designed to perform an optimization of at least one setpoint specification 17 by determining an extremum of a cost function. In this case, the received at least one temporal specification parameter trajectory 11 is included in the cost function, and the cost function is evaluated for the prediction horizon. In particular, an extremum of the cost function is determined, in particular in compliance with constraints for the prediction horizon. In particular, the cost function for the prediction horizon is minimized. This occurs optionally as shown above in connection with equations (1) to (3).

The at least one specification parameter for which operator device 1 creates specification parameter trajectory 11 is optionally selected from a group consisting of: a power requirement; a torque; and a speed.

The at least one secondary control module 19 is optionally selected from a group consisting of: a fuel supply regulator; a gas path regulator; and an exhaust gas aftertreatment regulator. In the embodiment shown here, a first secondary control module 19.1 of the secondary control modules 19 is optionally designed as a fuel supply regulator, a second secondary control module 19.2 of secondary control modules 19 is designed as a gas path regulator, and a third secondary control module 19.3 of the secondary control modules 19 is designed as an exhaust gas aftertreatment regulator.

Control device 5, in particular primary control module 15, optionally has an operating limit module 27, which is operatively connected to operator interface 25 and is designed to obtain at least one specification parameter trajectory 11. Operating limits module 27 is further designed to limit the at least one specification parameter trajectory 11 based on at least one predetermined operating limit for internal combustion engine 13 and to obtain at least one first limited specification parameter trajectory. Alternatively, or additionally, operating limits module 27 is designed to determine at least one operating limits trajectory for the prediction horizon for at least one operating limit of internal combustion engine 13 on the basis of the at least one specification parameter trajectory 11. Operating limits module 27 is optionally interconnected with determination module 23 and is designed to transmit at least a first trajectory 29, selected from the at least one first limited specification parameter trajectory and the at least one operating limits trajectory, to determination module 23 for the determination of the at least one setpoint specification 17. Determination module 23 is moreover designed to determine the at least one setpoint 17 based on the at least one first trajectory 29.

Control device 5, in particular primary control module 15, optionally includes a requirement module 31, which is operatively connected to operator interface 25 and is designed to obtain at least one specification parameter trajectory 11. Requirements module 31 is further established to limit the at least one specification parameter trajectory 11 on the basis of at least one predetermined, in particular legal, requirement for the operation of internal combustion engine 13 and to obtain at least a second limited specification parameter trajectory. Alternatively, or additionally, requirements module 31 is designed to determine at least one requirement trajectory for the prediction horizon for at least one requirement for the operation of internal combustion engine 13 on the basis of the at least one specification parameter trajectory 11. Requirement module 31 is optionally connected to determination module 23 and is designed to transmit at least a second trajectory 33, selected from the at least one second limited specification parameter trajectory and the at least one requirement trajectory, to determination module 23 for the determination of at least one setpoint 17. Determination module 23 is designed to determine the at least one setpoint 17 based on the at least one second trajectory 33.

Optionally, control device 5, in particular primary control module 15, has a target module 35, which is optionally connected to determination module 23 and is designed to determine, that is, in particular to specify, at least one target specification 37 and to transmit at least one target specification 37 in particular as a control target to determination module 23 for the determination of at least one setpoint specification 17. Determination Module 23 is designed to determine the at least one setpoint specification 17 against minimum target specification 37.

The minimum predetermined operating limit is optionally selected from a group consisting of: a maximum peak combustion chamber pressure; a maximum exhaust gas temperature; a maximum combustion chamber pressure gradient; and a latest fuel injection end point.

The at least one predetermined requirement is selected from a group consisting of: maximum nitrogen oxide emission; maximum particulate emission; and maximum hydrocarbon emission.

The at least one target specification 37 is optionally a minimum fuel consumption. Alternatively, a minimum fuel consumption can also be used as a predetermined requirement in the requirement module 31.

Determination module 23 is optionally designed to perform the model-based predictive control process on the basis of at least one Gaussian process model, in particular as shown above in connection with equations (4) to (6).

Determination module 23 is optionally designed to determine the at least one setpoint specification 17 as the setpoint trajectory for the prediction horizon.

Figure 2:
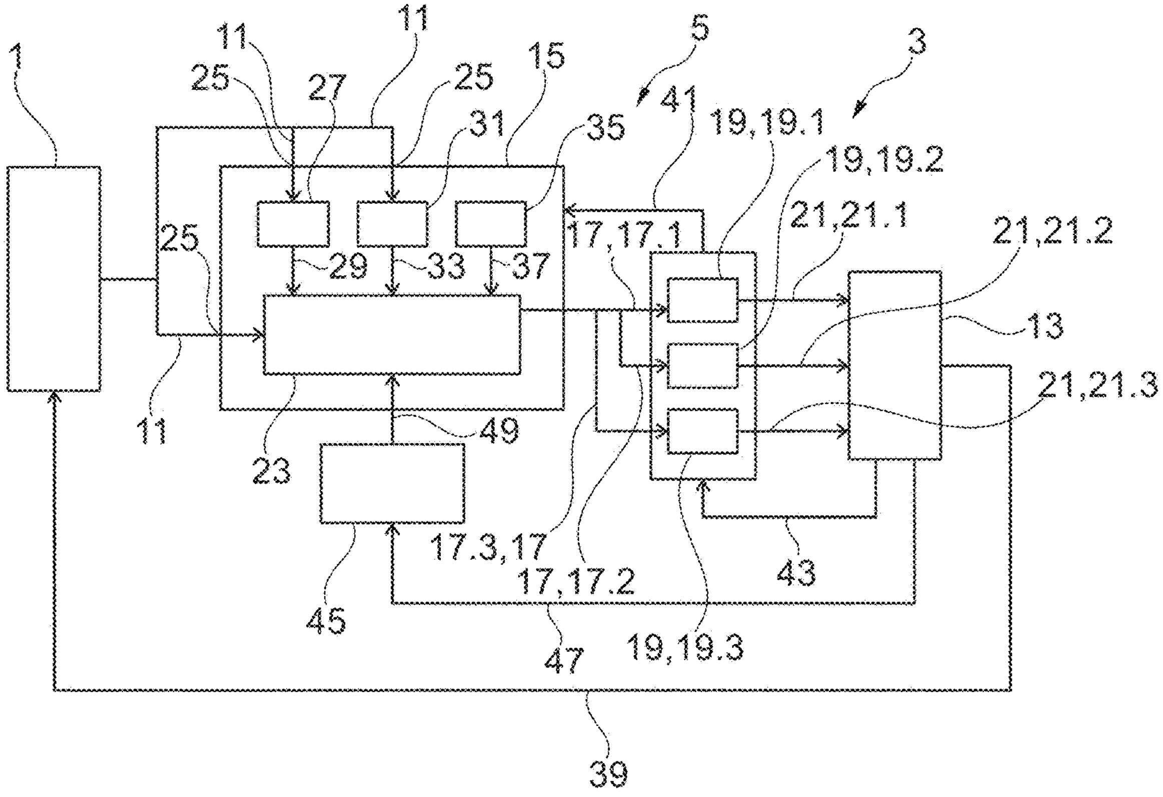
FIG. 2 is a schematic representation of a design example of a method for operating an internal combustion engine.

FIG. 2 shows a schematic representation of an embodiment of a method for operating internal combustion engine 13.

Identical and functionally identical elements are provided with the same identifications in all figures, so that reference is made to the previous description in each case.

In the context of the method for operating internal combustion engine 13, at least one temporal specification parameter trajectory 11 is provided at least for a prediction horizon based on a physical time constant of at least one secondary control module 19 of internal combustion engine 13, wherein at least one setpoint specification 17 for the at least one secondary control module 19 is provided as a function of the at least one temporal specification parameter trajectory 11 by way of a model-based predictive control method evaluating at least one specification parameter trajectory 11 for the prediction horizon. Depending on the at least one setpoint specification 17, at least one control specification 21 is determined by the at least one secondary control module 19, whereby at least one actuator—in particular internal combustion engine 13—is controlled by way of the at least one control specification 21.

In particular, at least one specification parameter trajectory 11 is provided by an operator of internal combustion engine 13 or by operator device 1.

The at least one specification parameter trajectory is optionally determined depending on a load variable 39 reported by internal combustion engine 13 or by control device 5. Alternatively, it is possible that reported load variable 39 is an actual torque of internal combustion engine 13. Alternatively, it is possible that reported load magnitude 39 is an actual torque of internal combustion engine 13. Other load magnitudes 39 are also conceivable.

In particular, a first setpoint specification 17.1 determined by determination module 23 for first secondary control module 19.1, which is designed as a fuel supply regulator, is a target rail pressure, a target injection start and/or a target injection volume. Determination module 23 optionally determines three initial setpoint specifications 17.1, namely the target rail pressure, the target injection start, and the target injection volume.

In particular, a second setpoint specification 17.2 determined by determination module 23 for second secondary control module 19.2, which is designed as a gas path regulator, is a target air mass flow and/or a target boost pressure. Determination module 23 optionally determines three second setpoint specifications 17.2, namely the target air mass flow and the target boost pressure.

In particular, a third setpoint specification 17.3 determined by determination module 23 for third secondary control module 19.3, which is designed as an exhaust gas aftertreatment regulator, is a target pollutant concentration, in particular the target nitrogen oxide concentration in the exhaust gas.

In particular, first secondary control module 19.1, which is designed as a fuel supply regulator, specifies as a first control specification 21.1 start of energization for a fuel input device, in particular an injector, end of energization for the fuel input device, and/or a control variable for at least one rail actuator, selected from a group consisting of: a pressure control valve of a fuel rail; a suction throttle; and a fuel pump. First secondary control module 19.1 optionally determines three initial control specifications 21.1, namely start of energization, end of energization, and the control variable for the at least one rail actuator.

In particular, second secondary control module 19.2, which is designed as a gas path regulator, determines at least one setpoint value for at least one flap position or valve position as a second control specification 21.2, in particular for a throttle valve or a bypass valve of an exhaust gas turbocharger of internal combustion engine 13.

In particular, third secondary control module 19.3, which is designed as an exhaust gas aftertreatment controller, determines as a third control specification 21.3 a control variable for a reactant delivery device, in particular for injecting a reducing agent, in particular a urea-water solution, into an exhaust gas path of internal combustion engine 13, in particular upstream of an SCR catalytic converter.

Secondary control modules 19—which are combined into a group here for the sake of simplicity—optionally report back at least one initial feedback value 41 to primary control module 15. The at least one initial feedback value 41 is optionally selected from a group consisting of: an actual rail pressure; a current limit for at least one setpoint specification 17—in particular as a target limit value; an actual air mass flow; an actual boost pressure; and a time constant for a controller dynamic of at least one secondary control module 19 of the secondary control modules 19, in particular for determining the prediction horizon.

Internal combustion engine 13, for its part, optionally reports at least a second feedback value 43 back to secondary control modules 19. The at least one second feedback value 43 is optionally selected from a group consisting of: an actual rail pressure; an actual flap position; an actual boost pressure; a current combustion air ratio, that is, a lambda value; and a control variable limit of an actuator. Secondary control modules 19 are designed in particular to determine first feedback value 41 on the basis of second feedback value 43, or to report second feedback value 43 back to primary control module 15 as first feedback value 41.

Control device 5 moreover includes an adaptation module 45, which is designed to adapt the model-based predictive control method used in determination module 23, in particular the at least one Gaussian process model, during operation of internal combustion engine 13. For this purpose, internal combustion engine 13 optionally transmits to the adaptation module 45 at least one adaptation parameter 47, such as an actual exhaust gas temperature, an actual nitrogen oxide concentration, or another suitable parameter, as well as in particular actual states of the speed, actual states of the gas path, such as the actual boost pressure and the actual air mass flow, and/or actual states of the fuel input, for example the start of injection, injection volume and/or injection pressure. Adaptation model 45 then adapts the model-based predictive control method, in particular by supplementing or exchanging data points in the at least one Gaussian process model, and thus obtains an adapted model. Adaptation module 45 optionally smooths or filters the adapted model, that is, in particular coefficients of the adapted model, over time, and thus obtains a smoothed adapted model 49, in particular in the form of smoothed coefficients, which it transmits to determination module 23 for use in the control of internal combustion engine 13. Thus, discontinuous or erratic operation of the internal combustion engine can be advantageously avoided.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A control device for an internal combustion engine, the control device comprising:

a primary control module; and at least one secondary control module, the primary control module being configured for determining at least one setpoint specification for the at least one secondary control module, the at least one secondary control module being configured for determining at least one control specification for controlling at least one actuator depending on the at least one setpoint specification, the primary control module including a determination module and an operator interface, the determination module being configured for determining the at least one setpoint specification by way of a model-based predictive control method taking into account a prediction horizon based on a physical time constant of the at least one secondary control module, the operator interface being configured for receiving at least one temporal specification parameter trajectory for at least one specification parameter specified by an operator or an operator device, the determination module being configured for determining the at least one setpoint specification depending on the at least one temporal specification parameter trajectory—which has been received—by way of the model-based predictive control method by evaluating the at least one temporal specification parameter trajectory for the prediction horizon, the determination module being further configured for conducting an optimization of the at least one setpoint specification by determining an extremum of a cost function, wherein the at least one temporal specification parameter trajectory—which has been received—enters into the cost function, and wherein the cost function is evaluated for the prediction horizon, wherein the cost function, expressed as I(u,x,z), is $$I(u, x, z) = \frac{1}{t_P} \int_{t'}^{t'+t_P} \sum_i \Gamma_i \left(1 - \frac{J_i(u(t), x(t), z)}{J_{i,s}(t)}\right)^2 dt,$$

wherein t'is a current point in time, $t_p$ is the prediction horizon, i is a run index, $\Gamma_i$ refers to a plurality of weighting factors, Ji(u(t),x(t),z) refers to a plurality of cost terms, u(t) is the at least one setpoint specification, x(t) refers to a plurality of measurands that co-determine respective ones of the cost term, z refers to a plurality of conditions that cannot be influenced and on which the cost term depends, and $J_{i,s}(t)$ refers to a plurality of default values.

2. The control device according to claim 1, wherein the at least one specification parameter is selected from a group consisting of: a power requirement; a torque; and a speed.

3. The control device according to claim 1, wherein the at least one secondary control module is selected from a group consisting of: a fuel supply regulator; a gas path regulator; and an exhaust gas aftertreatment regulator.

4. The control device according to claim 1, further including an operating limit module, which is operatively connected with the operator interface and is configured for receiving the at least one temporal specification parameter trajectory, wherein the operating limit module is further configured for at least one of:

(a)(i) limiting the at least one temporal specification parameter trajectory based on at least one predetermined operating limit for the internal combustion engine, and (ii) receiving at least one first limited specification parameter trajectory, and (b) determining at least one operating limit trajectory for the prediction horizon for at least one operating limit of the internal combustion engine based on the at least one temporal specification parameter trajectory, wherein the operating limit module is configured for transmitting (a) the at least one first limited specification parameter trajectory and (b) the at least one operating limit trajectory to the determination module for determination of the at least one setpoint specification, wherein the determination module is configured for determining the at least one setpoint specification based on at least one of (a) the at least one first limited specification parameter trajectory and (b) the least one operating limit trajectory.

5. The control device according to claim 4, further including a requirement module, which is operatively connected to the operator interface and is configured for obtaining the at least one temporal specification parameter trajectory, wherein the requirement module is configured for at least one of:

(a)(i) limiting the at least one temporal specification parameter trajectory based on at least one predetermined requirement for operating the internal combustion engine and (ii) obtaining at least one second limited specification parameter trajectory, and (b) determining by way of the at least one temporal specification parameter trajectory at least one requirement trajectory for the prediction horizon for at least one requirement for operating the internal combustion engine, wherein the requirement module is configured for transmitting at least one of the at least one second limited specification parameter trajectory and the at least one requirement trajectory to the determination module for determining the at least one setpoint specification, wherein the determination module is configured for determining the at least one set point specification by way of at least one of the at least one second limited specification parameter trajectory and the at least one requirement trajectory.

6. The control device according to claim 5, wherein the predetermined requirement is a legal requirement.

7. The control device according to claim 5, wherein the at least one predetermined operating limit is selected from a group consisting of: a maximum peak combustion chamber pressure; a maximum exhaust gas temperature; a maximum combustion chamber pressure gradient; and a latest fuel injection end point.

8. The control device according to claim 5, wherein the at least one predetermined requirement is selected from a group consisting of: a maximum nitrogen oxide emission; a maximum particulate emission; and a maximum hydrocarbon emission; and a minimal fuel consumption.

9. The control device according to claim 1, wherein the determination module is configured for performing the model-based predictive control method based on at least one Gaussian process model.

10. The control device according to claim 1, wherein the determination module is configured for determining the at least one setpoint specification as a setpoint trajectory for the prediction horizon.

11. A method for operating an internal combustion engine, the method comprising the steps of:

providing at least one temporal specification parameter trajectory for at least one prediction horizon based on a physical time constant of at least one secondary control module for the internal combustion engine, an operator interface being configured for receiving the at least one temporal specification parameter trajectory for at least one specification parameter specified by an operator or an operator device;

determining, by a determination module, at least one setpoint specification for the at least one secondary control module depending on the at least one temporal specification parameter trajectory by way of a model-based predictive control method by evaluating the temporal specification parameter trajectory for the at least one prediction horizon, the determination module being further configured for conducting an optimization of the at least one setpoint specification by determining an extremum of a cost function, wherein the at least one temporal specification parameter trajectory—which has been received—enters into the cost function, and wherein the cost function is evaluated for the at least one prediction horizon, wherein the cost function, expressed as I(u,x,z), is $$I(u, x, z) = \frac{1}{t_P} \int_{t'}^{t'+t_P} \sum_i \Gamma_i \left(1 - \frac{J_i(u(t), x(t), z)}{J_{i,s}(t)}\right)^2 dt,$$

wherein t'is a current point in time, $t_p$ is the at least one prediction horizon, i is a run index, $\Gamma_i$ refers to a plurality of weighting factors, Ji(u(t),x(t),z) refers to a plurality of cost terms, u(t) is the at least one setpoint specification, x(t) refers to a plurality of measurands that co-determine respective ones of the cost term, z refers to a plurality of conditions that cannot be influenced and on which the cost term depends, and $J_{i,s}(t)$ refers to a plurality of default values; and controlling an actuator by way of at least one control specification.

12. The method according to claim 11, wherein the at least one temporal specification parameter trajectory is provided by an operator or an operator device of the internal combustion engine.

13. The method according to claim 11, wherein the at least one temporal specification parameter trajectory is determined depending on a load variable reported back by the internal combustion engine.

14. A power delivery system, comprising:

an internal combustion engine arrangement, which includes an internal combustion engine and a control device for the internal combustion engine, the control device including:

primary control module; and at least one secondary control module, the primary control module being configured for determining at least one setpoint specification for the at least one secondary control module, the at least one secondary control module being configured for determining at least one control specification for controlling at least one actuator depending on the at least one setpoint specification, the primary control module including a determination module and an operator interface, the determination module being configured for determining the at least one setpoint specification by way of a model-based predictive control method taking into account a prediction horizon based on a physical time constant of the at least one secondary control module, the operator interface being configured for receiving at least one temporal specification parameter trajectory for at least one specification parameter specified by an operator or an operator device, the determination module being configured for determining the at least one setpoint specification depending on the at least one temporal specification parameter trajectory—which has been received—by way of the model-based predictive control method by evaluating the at least one temporal specification parameter trajectory for the prediction horizon, the determination module being further configured for conducting an optimization of the at least one setpoint specification by determining an extremum of a cost function, wherein the at least one temporal specification parameter trajectory—which has been received—enters into the cost function, and wherein the cost function is evaluated for the prediction horizon, wherein the cost function, expressed as I(u,x,z), is $$I(u, x, z) = \frac{1}{t_P}\int_{t'}^{t'+t_P}\sum_i \Gamma_i\left(1 - \frac{J_i(u(t), x(t), z)}{J_{i,s}(t)}\right)^2 dt,$$

wherein t'is a current point in time, $t_p$ is the prediction horizon, i is a run index, $\Gamma_i$ refers to a plurality of weighting factors, Ji(u(t),x(t),z) refers to a plurality of cost terms, u(t) is the at least one setpoint specification, x(t) refers to a plurality of measurands that co-determine respective ones of the cost term, z refers to a plurality of conditions that cannot be influenced and on which the cost term depends, and $J_{i,s}(t)$ refers to a plurality of default values.

15. The power delivery system according to claim 14, wherein the power delivery system is configured for being operated by the operator device which is configured for determining the at least one temporal specification parameter trajectory which is to be used in the control device.

16. The power delivery system according to claim 15, wherein the power delivery system is a motor vehicle, a rail vehicle, or a mining vehicle.

* * * * *